March 4, 1958 P. J. R. FAUCHEUX 2,825,273
MACHINE INTENDED FOR THINNING-OUT PLANTS SOWN IN LINE
Filed Feb. 16, 1954 5 Sheets-Sheet 1
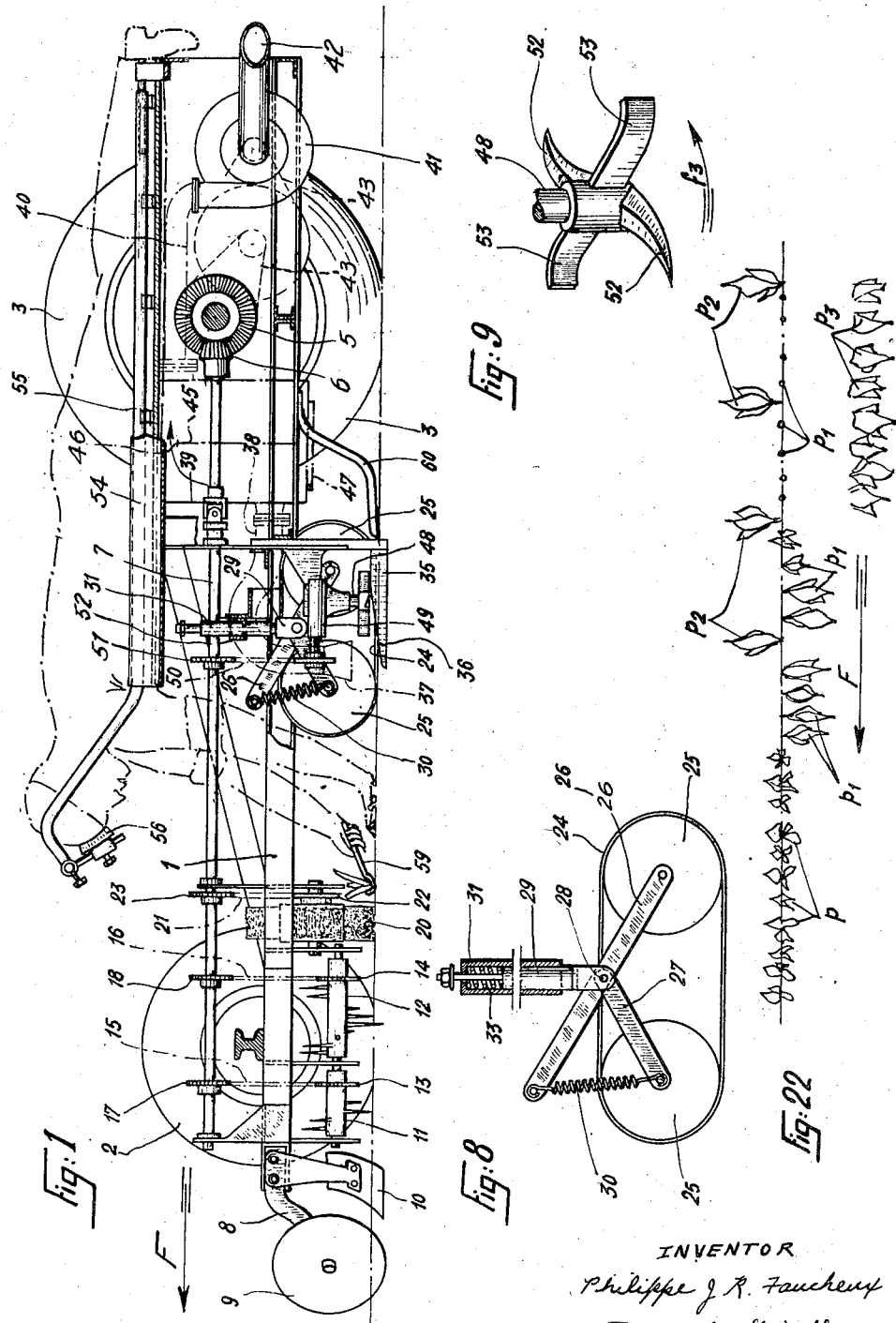
INVENTOR
Philippe J. R. Faucheux
By Watson, Cole, Grindle & Watson
ATTORNEYS

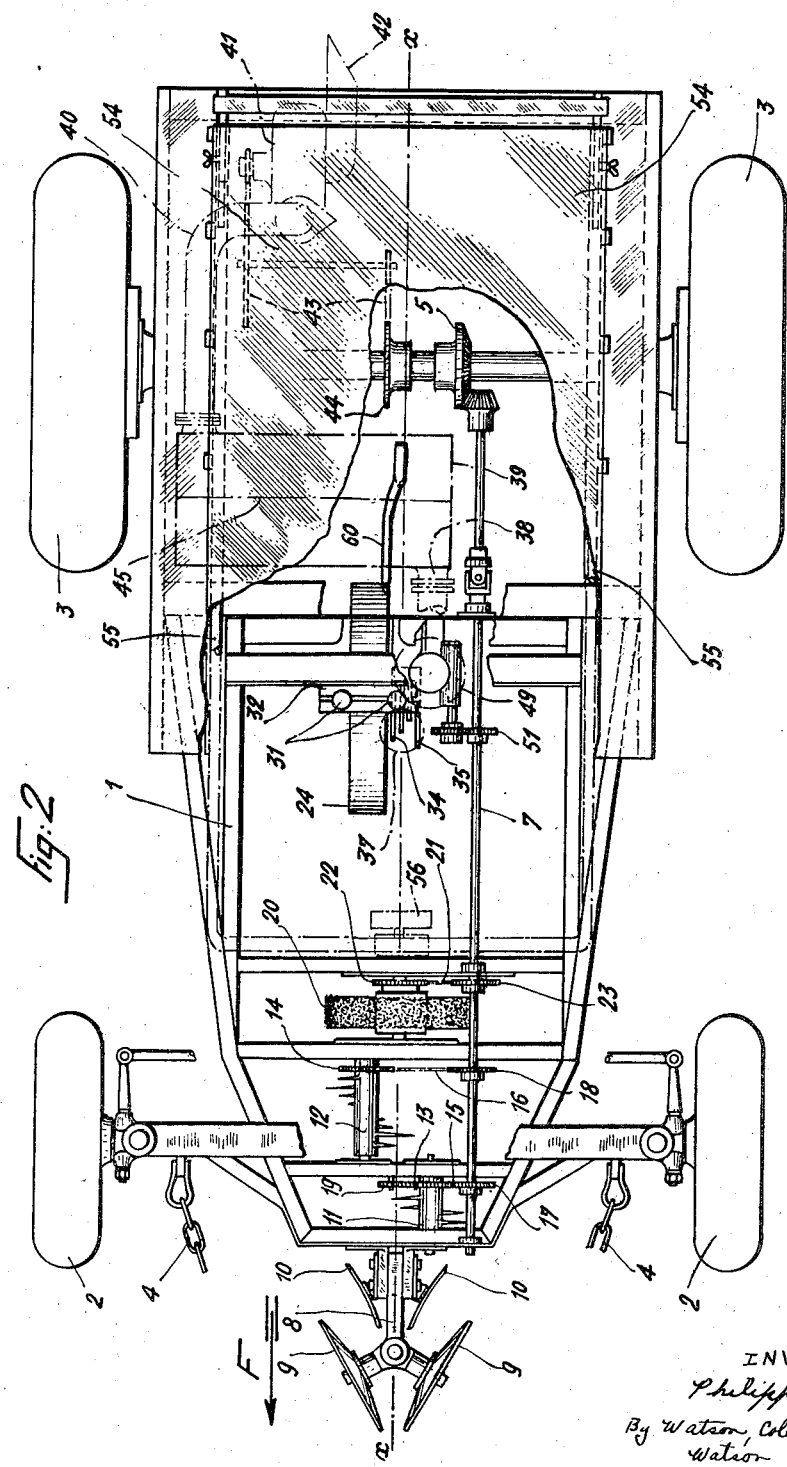

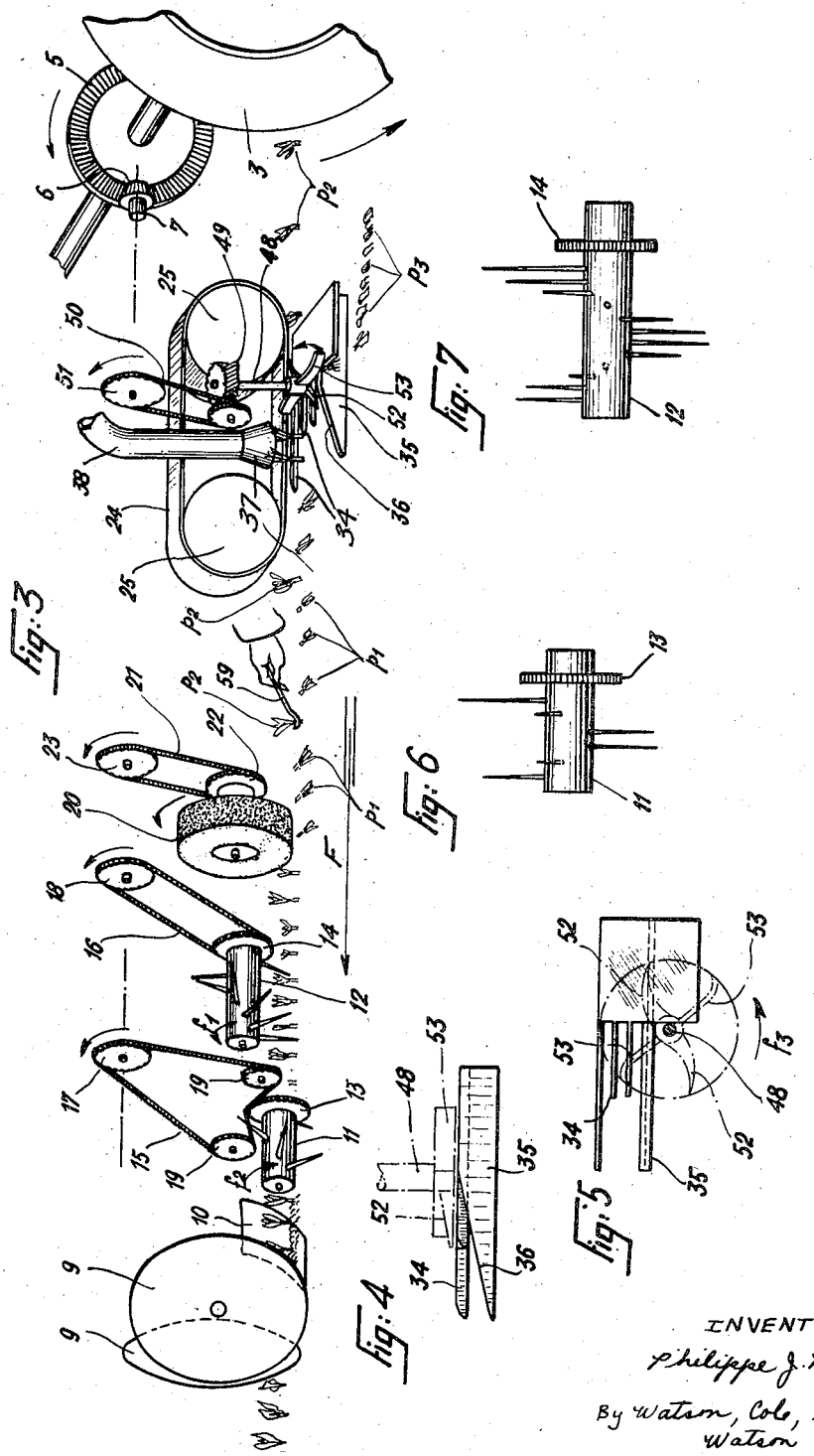

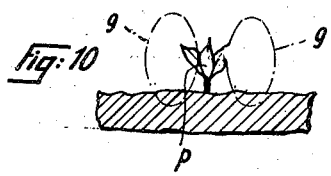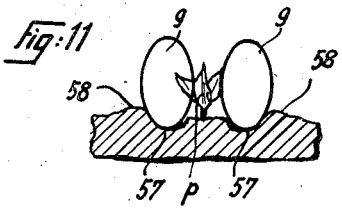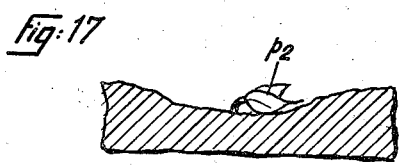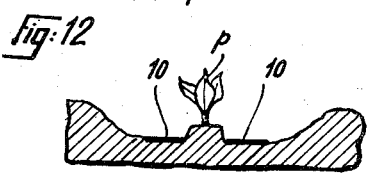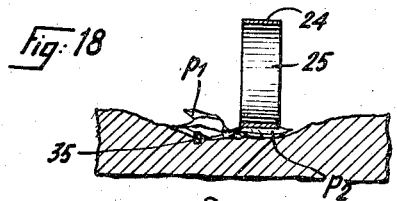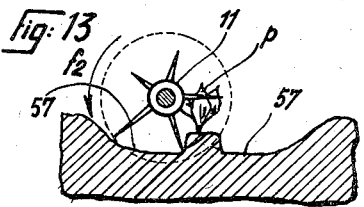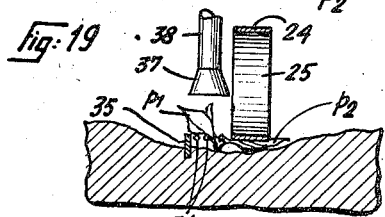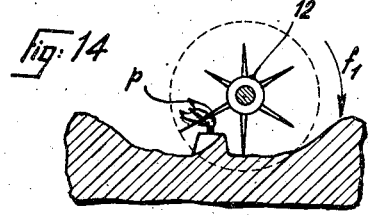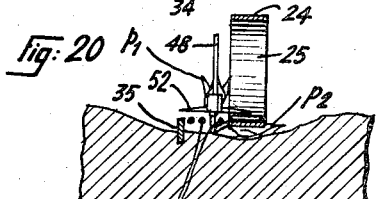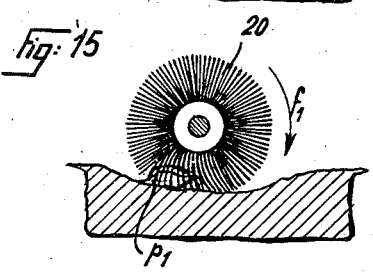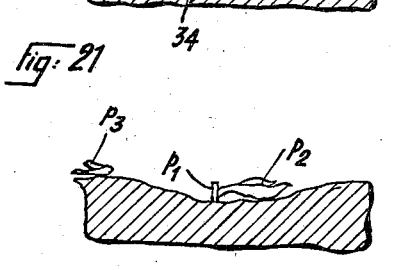

March 4, 1958 P. J. R. FAUCHEUX 2,825,273
MACHINE INTENDED FOR THINNING-OUT PLANTS SOWN IN LINE
Filed Feb. 16, 1954 5 Sheets-Sheet 5
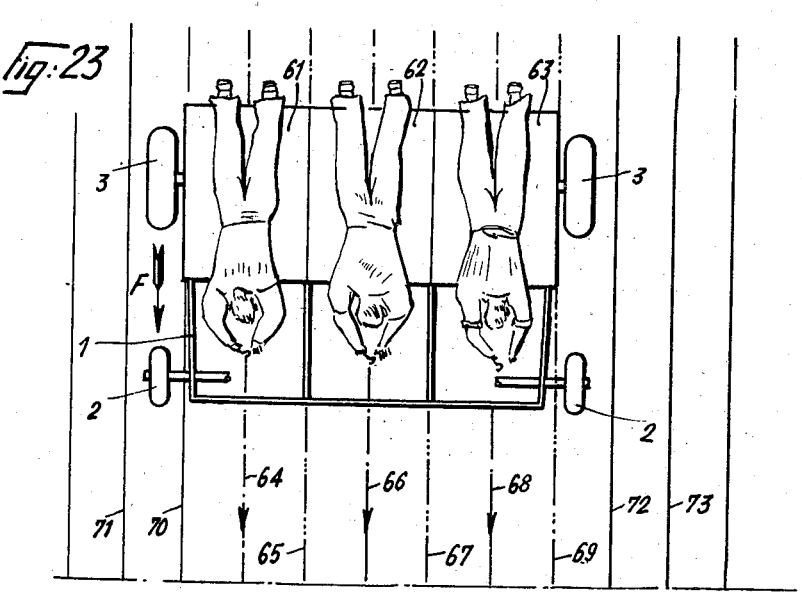
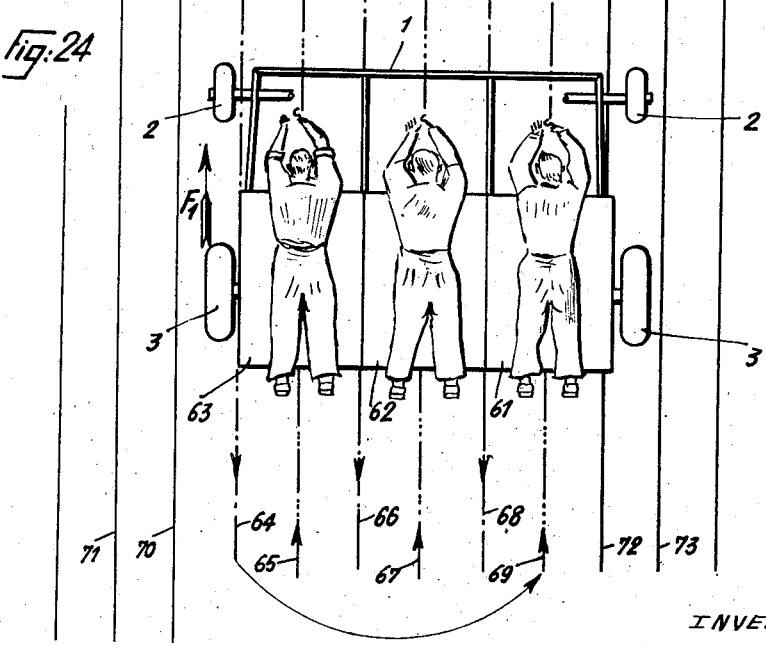
INVENTOR
Philippe J. R. Faucheux
By Watson, Cole, Grindle &
Watson
ATTORNEYS

United States Patent Office 2,825,273
Patented Mar. 4, 1958

2,825,273
MACHINE INTENDED FOR THINNING-OUT PLANTS SOWN IN LINE
Philippe J. R. Faucheux, Gonesse, France
Application February 16, 1954, Serial No. 410,603
Claims priority, application France February 26, 1953
12 Claims. (Cl. 97—12)

The present invention is concerned with a machine for effecting the thinning-out of plants sown in line. This machine comprises members adapted to cut off plants which are laid down on one side of the line of plantation, the said members being preferably combined with devices intended to protect and to remove from the action of the cutting members plants which have been laid down on the other side of the same line of plantation.

A particular object of this invention is to provide a machine which comprises means for, in the first instance, laying all the plants down on one side of the plantation line, said means including a mechanism adapted for this function, such as a rotating brush, the selection of the plants to be retained and their laying-down on the opposite side of the same line being carried out by an operator who accompanies the machine.

Another object is to provide a machine arranged to carry at least one operator in such a position that he can constantly keep watch on the ground and the plants without difficulty and can also easily reach the latter.

Still another object is to provide a machine which comprises means adapted for working the ground and removing all weeds so as to give the selected plants the best conditions for their development, with a view to their future yield.

The specific nature of the invention, as well as other objects and advantages will clearly appear in more detail, with particular reference to the figures of the accompanying drawings in which:

Fig. 1 is a view in elevation, with portions in cross-section, of the machine which forms the object of the invention.

Fig. 2 is a plan view of the machine shown in Fig. 1.

Fig. 3 is a diagrammatic view in perspective showing the different parts of the machine.

Fig. 4 is a view in elevation of the device for raising, cutting-off and ejecting the plants to be eliminated.

Fig. 5 is a plan view of the device shown in Fig. 4.

Figs. 6 and 7 are views in elevation of the two toothed cylinders.

Fig. 8 is a detail view of the band which holds down and protects the plants to be retained.

Fig. 9 is a perspective view of the cutting and ejecting device for the plants to be thinned-out.

Figs. 10 to 21 are diagrammatic views in vertical cross-section showing the successive stages of the work carried out by the machine.

Fig. 22 is a plan view showing a line of plants in course of being worked by the machine.

Figs. 23 and 24 are two diagrammatic views in plan showing the arrangement of a machine which is intended to work on a number of lines of plants at the same time.

With reference to Figs. 1 and 2, it will be seen that the machine is made up of a chassis 1 comprising front steering-wheels 2 and rear carrying-wheels 3. In the examples shown, the travelling chassis is intended to be towed in any convenient manner, for example by means of the chains 4.

The rear wheels 3 cause the rotation of a bevel ring gear or crown wheel 5 which engages with a pinion 6 keyed to the end of a longitudinal shaft 7, by means of which all the driven members of the machine are operated.

At the front, the chassis 1 comprises a support 8, at the end of which there are mounted, in the usual way, a pair of cutting discs 9 which are followed by horizontal cutters 10.

Rearward of support 8, the chassis carries two toothed cylinders or "hedgehogs" 11 and 12, shown in the detail views of Figs. 6 and 7, and on which it is seen that, in the case of each cylinder, the length of the teeth progressively increases from the front end of the cylinder to the rear end of this latter, the teeth being distributed in a spiral along the periphery of the cylinders, the rear cylinder having a length greater than that of the front cylinder and, in consequence, having a larger number of teeth than the said front cylinder, the pitch of the tooth mountings being the same for both the cylinders which are also of equal diameter. The teeth located at the rear end of the cylinder 12 are greater in length than the corresponding teeth on the cylinder 11.

The cylinders 11 and 12 are each provided with sprockets 13 and 14, respectively, driven by the chains 15 and 16 mounted on drive sprocket 17 and 18 which are keyed to the longitudinal shaft 7.

The chain 16 is associated with the sprocket 14 and causes rotation of the cylinder 12 in the direction shown by the arrow $f_1$ (Fig. 3), whilst the chain 15 which passes around the reversing sprockets 19 imparts a rotation to cylinder 11 which is the reverse of that of the cylinder 12, as shown by the arrow $f_2$.

The discs 9, the horizontal cutters 10 and the cylinders 11 and 12, are arranged symmetrically with respect to the longitudinal axis of the chassis 1; this axis, which is shown at $x$—$x$, is maintained as far as possible in alignment, during the travel of the machine, with the line of plants which are to be thinned-out.

Behind the cylinders 11 and 12, there is provided a rotating brush 20 mounted on axis $x$—$x$; this brush is caused to rotate by a chain 21 passing round sprockets 22, 23.

The discs, horizontal cutters, the cylinders and the brush referred to above are mounted on supporting members which enable the position of these components to be regulated in height, so that they either dig into the ground or they may be raised above the ground to a greater or less extent.

Behind brush 20 and laterally of the axis $x$—$x$, there is arranged an endless band 24 mounted on two rollers 25 which are arranged so as to ensure a constant tension on band 24, the rollers being mounted to this end at the end of two sets of arms 26 and 27 which are hingedly mounted at 28 on supports 29. A set of arms and a supporting member therefor is arranged at each side of the belt and the tensioning of the latter is ensured by at least one spring 30.

Each of the supports 29 is slidably mounted in a socket member 31 (Figs. 2 and 8). These sockets are fixed to the chassis at 32 (Figs. 1 and 2) and each contains a spring 33 providing a spring load on the lower portion of the belt 24 on the ground.

Opposite the belt 24 and mounted laterally across the axis $x$—$x$, a comb 34 completed along its edge opposite to that adjacent to the belt 24, by a blade 35 (see Figs. 1 to 5) the front end of which is given the form of an inclined ramp 36.

Above the comb 34 of the blade 35, there is located a nozzle 37 forming the end of a pipe 38 which is connected to a chamber 39 which is in turn connected by the pipe 40 to an exhaust fan 41, the outlet orifice of which is shown at 42. This fan 41 is rotatably driven through the intermediary of the transmission 43 by a wheel 44 keyed directly on to the shaft of the rear wheels 3.

The box 39 which acts as a sub-pressure air-chamber, comprises a central partition 45 extending over one part only of the height of the box in order to permit, at 46, the circulation of air drawn in by the fan, this air being loaded with dust or with fine particles of earth sucked up by the nozzle 37, the baffle-plate constituted by the partition 45 serving to prevent this dust from being carried into the fan 41. An emptying door 47 is provided for cleaning out the box.

Behind the nozzle 37 there is arranged a rotating member, the shaft 48 of which is rotatably driven, through the intermediary of a reduction gearing 49, by a chain 50 driven by a sprocket 51 which is keyed to the longitudinal shaft 7 (Figs. 1 and 3).

The rotary member referred to above comprises two diametrically-opposite cutting blades 52 arranged in the form of a cross with two arms 53 (Figs. 5 and 9); the direction of rotation of this member is indicated by the arrows $f_3$.

The band or belt 24, the lifting-blade 35 and the rotating member 52, 53, are mounted fixedly and elastically on the framework 1 in such a way that these members may follow to the fullest extent the variations in level of the ground (horses' hoof-prints, tracks of wheels or tractor tracks, bad furrows, etc.).

In the same way, provision is made for the position of these members, as well as that of the discs 9, the horizontal cutters 10, and the cylinders 11 and 12, to be capable of regulation in width with respect to the axis $x-x$ in accordance with the nature of the plants to be thinned-out.

The rear portion of the machine is arranged to serve as a support for the operator who carries out the selection of the plants to be retained. This operator lies flat on his stomach on a kind of hammock, made, for example, of a piece of canvas 54 supported by its lateral edges on a small framework 55 fixed to the chassis 1. The arrangement of the hammock is such that the operator being prone, with his head in the direction of the front of the machine, his arms can easily reach the ground. A head-support 56, the position of which can be regulated, is provided to reduce fatigue.

The operation of the machine arranged in the manner described above, is as follows:

The machine is brought on to the field in such a way that the longitudinal axis $x-x$ of the machine is, as far as possible, superposed on the line of plants to be thinned-out, the wheels of the machine rolling along the ground in the areas included between the line of plants to be worked and the adjacent lines.

The machine is moved in the direction shown by the arrows F with the cutting discs 9 rolling along the ground on opposite sides of the plants $p$ (Figs. 10 and 22). These discs are of concave shape and dig into the ground at 57 throwing the earth at 58 outwards on each side of the line of plants (Fig. 11). Following the discs, the horizontal cutters 10 level off the portions of the earth which have been worked on by the discs (Fig. 12), and remove the earth heaped up at 58 parallel to the line of plants $p$ and on each side of the latter by the action of the discs. The central portion between these two adjoining portions is then worked on by the toothed cylinders 11 and 12. In the first place, the cylinder 11 operates in the manner shown in Fig. 13. The rotation of this cylinder produces a harrowing effect; as the teeth of the cylinder which progressively increase in length from the front to the rear, the earth is attacked progressively and more and more deeply, so that there is no risk of the earth and the plants being lifted together in one lump.

The second toothed cylinder acts in its turn and harrows the ground to the right of the line of plants as shown in Fig. 14.

The last teeth of the cylinder 12 have a suitable length for working the soil fairly deeply and widely more to the left of the line of plants. The result is that the crest of earth existing between the plants in line is destroyed by the harrowing action; in addition these relatively long teeth tend, by their action, to lay-down the plants towards the left of the line of plantation as has been shown in Fig. 14.

Behind the cylinder 12, the brush 20 by its rotation completes the laying-down of the plants on the ground as shown at $p_1$ in Fig. 15 and in Fig. 22.

The successive working of the cylinders 11, 12 and of the brush 20 ensures that the plants are cleaned by being freed from earth and insect pests. Furthermore, the ground in the vicinity of the line of plants is freed from stones, dried sods, lumps of manure, etc. and also from all the noxious plants that are not tap-rooted.

The plants all being laid down to the left of the line of plantation, as is shown at $p_1$ (Figs. 2, 16 and 22) the manual operation then takes place.

The operator, who watches the plants pass under the machine, chooses from among the plants laid flat on the ground those which appear to him to be the most suitable for ultimately producing a good crop. By means of a small hook 59 (Figs. 1 and 3), the operator raises selected plants and lays them flat to the right of the line of plantation, as is shown at $p_2$ in Figs. 3, 17 and 22. He can, if need be, use his other hand for keeping the non-selected plants flat on the ground so as to be sure that only the plants which he has chosen are laid over to the right, (Fig. 1).

Following on this manual operation, the belt 24 which is driven by its spring contact with the ground, covers up the selected plants $p_2$ (Fig. 18), whilst the plants $p_1$ which are to be weeded-out, remain lying on the left.

These plants $p_1$ are then subjected to the conjoint action of suction nozzle 37 and lifting blade 35 as well as that of rake 34. The blade 35, by the action of its inclined ramp 36 successively raises the plants $p_1$ which are raised further by the suction effect of the nozzle 37 and are finally supported by the teeth of the rake 34 (Figs. 18 and 19), the selected plants $p_2$ being meanwhile held down against the ground by the action of the belt 24.

The plants $p_1$ which have now been raised up, are then submitted to the action of the rotating member arranged above the comb 34. The cutting blades 52 of this member cut off the plants $p_1$ and the curved arms 53 throw out the cut leaves $p_3$ into the zone of ground separating two lines of plantation, (Figs. 20 to 22). The cut off leaves are thus removed from the line of plants, thereby avoiding the propagation of green fly or diseases and facilitating work on the subsequent lines.

The plants $p_2$ which were selected, are then freed from the action of belt 24. As they are lying on a clean and suitably prepared soil, they will rapidly come upright again and their development will be accelerated as a result of the working of the soil in their proximity.

In order to hasten the straightening up of the plants $p_2$, provision is made for fixing to the rear of the chassis 1 a rod 60, the free end of which is arranged on the right of the axis $x-x$, so that the rod will pass underneath the plants $p_2$ and thus to ensure that they are detached from the ground and commence to straighten-up.

As may be understood, the machine which forms the object of the invention permits the thinning-out of plants to be carried out in a very good manner, since the selection is made by sight based on the opinion of the operator of the machine, and that the machine leaves in position only those plants so chosen and not a clump of plants here and there.

The machine may be used equally well for thinning-out all kinds of plants sown in lines: sugar beet, fodder crops, colza, maize, cabbages, etc.

The machine may also be arranged with a view to the simultaneous working of several lines of plants in course of its movement over the ground, and comprises for this purpose a number of working stations operating in parallel, each of these stations being equipped with the devices described above and being each manned by an operator who selects the plants to be retained.

The machine may be built with advantage so as to include three working stations, as shown at 61, 62 and 63 in Fig. 23. The width of each of these stations—which should be sufficient to enable free movement of the operator assigned to each station—is greater than the width between two successive lines of plants. It is thus intended that the work should not be carried out on successively juxtaposed lines, but on one line in two; for example, the operator of the station 61 will work on the line of plants shown at 64, the operator of the station 62 will work on the line 66, and the operator of the station 63 will work on the line 68, all this whilst the machine is being towed in the direction shown by the arrow F, the lines indicated by 70, 71 . . . being supposed to have been worked during the course of the preceding passages of the machine, whilst the lines 72, 73 . . . are to be worked subsequently.

At the end of the rows, the machine is turned around in order to work back in the direction of the arrow $F_1$, that is to say in the opposite direction to the preceding run.

In turning round, the machine, the wheels of which ram between the rows 71, 70 on the one hand and 69, 72 on the other hand, is moved so that its wheels travel between the rows 70, 64 on the one side and 72, 73 on the other side, that is to say the machine is displaced by one row with respect to the lines of plants, this displacement taking place towards that part of the ground which has not yet been worked.

By reason of this fact, the operators who occupy the three working stations of the machine will then work the lines of plants 65, 67 and 69.

It therefore follows that at the end of one to and fro run of the machine along the lines of plants, six lines of plants will have been worked.

It will be understood that in the case of large-scale cultivation, this particular arrangement of the machine is very favourable from the point of view of the cost of the work to be carried out.

It will be apparent that the embodiments shown are only exemplary and that various modifications can be made in construction and arrangement within the scope of our invention as defined in the appended claims.

I claim:

1. A machine for thinning out plants sown in line comprising, in combination, a frame, wheels mounted on and supporting said frame, a longitudinal drive shaft journalled in said frame and operatively connected to said wheels, mechanical means for laying down all the plants on the same side of the line of plantation on the soil, followed by means for maintaining flat on the soil, on the other side of said line, the plants to be preserved which are manually selected and laid down on said other side, mechanical means for lifting discarded plants lying on the first said side of the said line, these last means being followed by means for cutting the lifted plants and by means for ejecting the cut plants, all the mentioned means, with the exception of the means for maintaining selected plants flat on the other side of said line on the soil, being driven from said longitudinal shaft and being mounted on the machine, from front to rear, in the order in which they are mentioned above.

2. A machine as claimed in claim 1, in which the means already mentioned in this claim are preceded by means for working and for leveling the soil on each side of the line of plantation acting before the former said means come in action.

3. A machine as claimed in claim 2, in which the means for working the soil on each side of the line of plantation, before all plants are laid down on the soil, consists in at least a pair of rotary discs which are inclined from each other to form a V, the said discs being adapted to operate symmetrically on opposite sides of said line and being driven by ground contact.

4. A machine as claimed in claim 2, in which the means for leveling the soil on each side of the line of plantation, before all plants are laid down on the soil, comprises at least one horizontal earth knife associated with at least two toothed rotary cylinders located behind said working means, said cylinders being driven from said central shaft by means of sprocket and chain drives.

5. A machine as claimed in claim 4, in which said toothed rotary cylinders are mounted with their axes inclined to the longitudinal axis of the machine, the teeth of each said cylinder being set along a helical path along its periphery, the length of the said teeth increasing from the front extremity to the rear extremity of each said cylinder.

6. A machine as claimed in claim 1, in which the means for laying down all the plants on the same side of the line of plantation consists in one rotating brush, said brush being driven from said central shaft by sprocket and chain means.

7. A machine as claimed in claim 1, in which the means for maintaining selected plants flat on the other side of said line consists in an endless rolling belt which is supported by a pair of longitudinally spaced rollers, rotatably mounted transversely of the axis of said machine and on the opposite side of the line of plantation to the other said means, said belt being driven by ground contact.

8. A machine as claimed in claim 7, in which the said transverse rollers are mounted at the extremities of articulated lever arms, a spring being associated with said arms whereby a constant tension is applied to said endless belt.

9. A machine as claimed in claim 1, in which the means for lifting the discarded plants consists in one horizontal rake comprising a lifting blade and mounted on the side of the line of plantation on which plants to be thinned out are laid down.

10. A machine as claimed in claim 1, in which the means for cutting the discarded and lifted plants consists in a rotating cutter device comprising two diametrically opposite cutting blades, said device being mounted on a vertical rotary spindle driven from the central shaft by means of gears, and being located immediately above and towards the rear of said lifting means.

11. A machine as claimed in claim 1, in which the means for ejecting the discarded, lifted and cut plants comprises two ejector arms mounted on, and driven by, said vertical rotary spindle for said cutting means.

12. A machine as claimed in claim 1, in which the said means for maintaining selected plants flat on the soil, means for lifting and means for cutting and ejecting discarded plants, are all elastically suspended on the chassis of the machine, by means comprising a tubular socket member fixed to said chassis, a support member slidably mounted in said socket and pivoted at its lower extremity, and a compression spring inside said socket and acting on said support member.

References Cited in the file of this patent

UNITED STATES PATENTS

| | | |
|---|---|---|
| 216,283 | Mead | June 10, 1879 |
| 367,558 | Sibley | Aug. 2, 1887 |
| 650,170 | Culver | May 22, 1900 |
| 986,933 | Miner | Mar. 14, 1911 |
| 1,170,459 | Pierce | Feb. 1, 1916 |
| 1,718,818 | Hanson | June 25, 1929 |
| 2,182,157 | McDermott | Dec. 5, 1939 |
| 2,224,795 | Morrow | Dec. 10, 1940 |
| 2,583,571 | Howe | Jan. 29, 1952 |

FOREIGN PATENTS

| | | |
|---|---|---|
| 32,849 | Austria | May 11, 1908 |
| 502,839 | Germany | July 19, 1930 |
| 997,267 | France | Sept. 12, 1951 |